H. KERR.
TAP FOR TAPPING PIPES.
No. 36,907.  Patented Nov. 11, 1862.
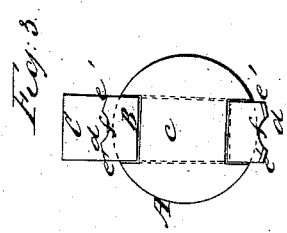
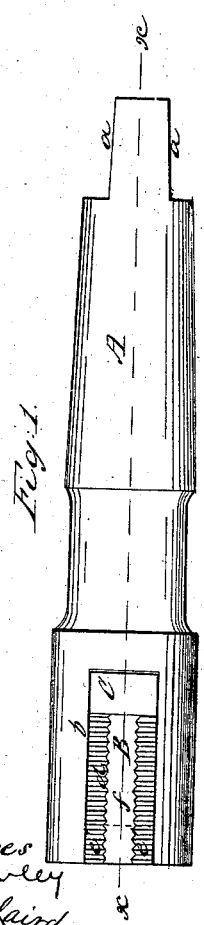
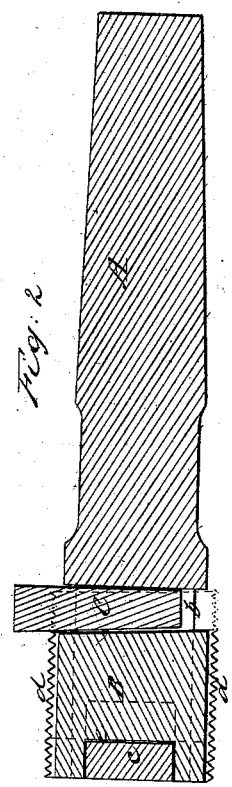
Witnesses
R. Gawley
James Laird
Inventor
Hugh Kerr

UNITED STATES PATENT OFFICE.

HUGH KERR, OF BROOKLYN, NEW YORK.

IMPROVED TAP FOR TAPPING PIPES.

Specification forming part of Letters Patent No. 36,907, dated November 11, 1862.

*To all whom it may concern:*

Be it known that I, HUGH KERR, of Brooklyn, in the county of Kings and State of New York, have invented a new and Improved Tap for Tapping Gas, Water, and other Pipes and Fittings; and I do hereby declare that the following is a full, clear, and exact description of the same, reference being had to the accompanying drawings, making a part of this specification, in which—

Figure 1 is an external view of my invention; Fig. 2, a longitudinal central section of the same, taken in the line $x\ x$, Fig. 1. Fig. 3 is an end view of the same.

Similar letters of reference indicate corresponding parts in the several figures.

This invention consists in having the cutter of the tap made separately from the shank or stock, and having the former fitted in the latter in such a manner that the cutter may be very readily detached from the shank or stock, and also readily secured in it, and in a firm substantial manner, so that in using the tap the cutter will not be allowed to work or play in the shank or stock.

The object of the invention is to obtain a tap which will admit of having various-sized cutters attached to one shank or stock, so that different-sized holes may have screw-threads cut in them by simply inserting the proper-sized cutter in the shank or stock.

To enable those skilled in the art to fully understand and construct my invention, I will proceed to describe it.

A represents the shank or stock of the implement, which may be of the usual form and of any proper size, and provided with two plane surfaces, $a\ a$, at its back end, to fit into a brace for the convenience of turning it. The front part of the shank or stock has a rectangular opening, $b$, made laterally through it. This opening is of slightly taper form in its transverse section, and it does not extend out to the front end of the shank or stock its entire length, but only at each end, a portion, $c$, of the shank or stock remaining or being left, as shown in Figs. 2 and 3.

B is the cutter, which is constructed of steel, and corresponds in form in its transverse section to the opening $b$. It, however, is wider than the opening $b$, so that its cutting-edges $d$ may project out from the side of the shank or stock, as shown in Figs. 2 and 3. The outer end of the cutter has a recess, $e$, made in it to receive the part $c$ of the shank or stock, and a key, C, is driven into the back part of the opening $b$, between its back end and the back end of the cutter, as shown clearly in Fig. 2. By this means the cutter will be firmly secured in the shank or stock without the possibility of its working or playing therein when applied to its work. The cutter B, it will be seen, is not made quite as long as the depth of the opening $b$, in order to leave a space for the insertion of the key C, which is represented as not being entirely driven in in Fig. 2. The cutting-edges of the cutter B are formed in the usual way—to wit, screw-threads $e$ being divided by grooves $f$.

In an implement or tap of this kind the essential feature is to secure the cutter firmly in the shank or stock. Tools have been made on this plan, with expanding cutters arranged in such a manner that the same cutters may be used for tapping various-sized holes; but they have proved inefficient on account of the cutters working loose and not being firm when the tool is operated. This difficulty is entirely obviated by my invention. Instead of using expanding cutters, I insert different-sized ones in the same shank or stock to suit the diameter of the hole in which the screw is to be cut. The key C and opening $b$, in consequence of being slightly taper in their transverse section, as shown in Fig. 3, the key C tapers at its opposite sides, as shown in Fig. 2, and the cutter provided with the recess $e$, to receive the part $c$ of the shank or stock, will secure the cutter firmly in the shank or stock, and all play of the former avoided equally so as if both were formed of one piece of metal. The cutter also, in consequence of being disconnected from the stock or shank, or not being formed in one piece with it, is not so liable to heat, as the cutter itself is comparatively small, and if heated it will readily cool, so as to be in perfect working order.

Having thus described my invention, what I claim as new, and desire to secure by Letters Patent, is—

The mode of securing the cutter B in the shank or stock A, as shown and described, by having an opening, b, made transversely through the outer part of the shank or stock A, and extending out at each end flush with the front end of the shank or stock, and providing the cutter B with a recess, e, to receive the part c of the shank or stock, in combination with the key C, substantially as set forth.

HUGH KERR.

Witnesses:
JAMES LAIRD,
J. W. COOMBS.